(12) United States Patent
Abdalla (10) Patent No.: US 9,094,735 B1
(45) Date of Patent: Jul. 28, 2015

(54) RE-PRESENTATION OF PREVIOUSLY PRESENTED CONTENT

(71) Applicant: Google Inc., Mountain View, CA (US)

(72) Inventor: Tarek Abdalla, Dubai (AE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/318,400

(22) Filed: Jun. 27, 2014

(51) Int. Cl.
*H04N 7/10* (2006.01)
*H04N 7/025* (2006.01)
*H04N 21/81* (2011.01)

(52) U.S. Cl.
CPC .................................. *H04N 21/812* (2013.01)

(58) Field of Classification Search
None
See application file for complete search history.

(56) References Cited

U.S. PATENT DOCUMENTS

| | | | | |
|---|---|---|---|---|
| 7,624,409 B2* | 11/2009 | Whymark | | 725/34 |
| 7,650,617 B2* | 1/2010 | Hoshino et al. | | 725/34 |
| 7,802,277 B2* | 9/2010 | Medford | | 725/25 |
| 8,365,217 B2* | 1/2013 | Legrand | | 725/32 |
| 8,595,760 B1 | 11/2013 | Singh | | |
| 8,713,600 B2* | 4/2014 | Shkedi | | 725/32 |
| 8,943,535 B2* | 1/2015 | Sakamoto et al. | | 725/32 |
| 2008/0235087 A1 | 9/2008 | Amento et al. | | |
| 2011/0191153 A1 | 8/2011 | Panje | | |
| 2013/0031593 A1 | 1/2013 | Booth | | |
| 2013/0086607 A1 | 4/2013 | Tom et al. | | |
| 2014/0031960 A1 | 1/2014 | Hill | | |
| 2014/0115631 A1 | 4/2014 | Mak | | |

* cited by examiner

*Primary Examiner* — Oschta Montoya
(74) *Attorney, Agent, or Firm* — Fish & Richardson P.C.

(57) ABSTRACT

Methods, systems, and apparatus, including computer programs encoded on a computer storage medium, for re-presentation of previously presented content. One of the methods includes providing a video advertisement for presentation on a user device along with a video content item, in response to receiving a request to view the video content item. First information is received that indicates that a user of the user device wants to skip the video advertisement or that the video advertisement has completed play. After receipt of the first information, a control to facilitate re-presentation of the video advertisement is provided. Second information is received indicating that the user of the user device has interacted with the control. The video advertisement is provided for re-presentation to the user device.

18 Claims, 5 Drawing Sheets

RE-PRESENTATION OF PREVIOUSLY PRESENTED CONTENT

BACKGROUND

Videos can be streamed over a network, e.g., the Internet, to users on client devices. Users can request videos related to specific subjects, and watch the videos on their user devices. The videos can be stored on a server accessible to the network, and streamed to user devices. The server can provide a resource or application, e.g., a webpage, displaying a user interface configured to allow for the searching of stored videos. For instance, a user can provide a search string, e.g., "cat videos", to the server and receive a list of videos relevant to the search string. A user can then select a video and download or otherwise receive (e.g., a stream) the selected video from the server.

After receiving a selection of a video by a user, the server can also stream a video advertisement to the user's device. The video advertisement can be related to the selected video, or can be a random video advertisement or otherwise selected. The server can provide (e.g., stream) the selected video such as before, during or after streaming the entirety or portion of the video advertisement to the user.

SUMMARY

This specification describes technologies relating to re-presentation of previously displayed content.

In general, one innovative aspect of the subject matter described in this specification can be embodied in methods that include the actions of: in response to receiving a request to view a video content item, providing a video advertisement for presentation on a user device along with the video content item; receiving first information indicating that a user of the user device wants to skip the video advertisement or that the video advertisement has completed play; after receiving the first information, providing a control to facilitate re presentation of the video advertisement; receiving second information indicating that the user of the user device has interacted with the control; and providing the video advertisement for re presentation to the user device.

These and other embodiments can each optionally include one or more of the following features. Providing the video advertisement further comprises: obtaining a static image from the video advertisement; and providing the static image for presentation along with the video content item. The actions include receiving information indicating that the user has interacted with the static image; and providing the video advertisement for re presentation. The actions include determining a state of the video advertisement. Providing a control comprises: determining, from the state of the video advertisement, that a play time of the video advertisement is greater than a threshold; and in response to the determination, providing the control to facilitate re presentation of the video advertisement. Providing a control comprises: determining, from the state of the video advertisement, that a play time of the video advertisement is less than a threshold; and in response to the determination, providing the control to facilitate re presentation of the video advertisement. Providing the video advertisement for re presentation comprises: determining a play time of the video advertisement from the state of the video advertisement; and providing the video advertisement for presentation to the user device, wherein the video advertisement is provided from the play time. Providing the video advertisement for re presentation comprises: determining, from the state of the video advertisement, that a play time of the video advertisement is less than a threshold; and providing a video advertisement with a shorter play time for presentation to the user device. The actions include obtaining information identifying an average watch time of the video advertisement; determining, from the state of the video advertisement, that a play time of the video advertisement is less than the average watch time; and providing a video advertisement with a shorter play time for presentation to the user device. The actions include determining a state of the video content item at a time of the interaction; determining, from the state of the video content item, a play time of the video content item; providing the video advertisement for re presentation to the user device; and providing the video content item from the play time for re presentation to the user device. Providing the video advertisement for re presentation comprises: providing a second control to facilitate skipping the video advertisement. Providing the video advertisement for re presentation comprises: providing a different video advertisement for presentation to the user device. The actions include redirecting the user device to a web page of a sponsor of the video advertisement. The actions include associating the video advertisement with a first cost; providing the video advertisement for re presentation to the user device; and in response to the providing, associating the video advertisement with a second greater cost.

Particular embodiments of the subject matter described in this specification can be implemented so as to realize none, one or more of the following advantages. A server can receive a user selection of a video for display on the user's device, and in response can first provide a video advertisement for display on the user device followed by display of the client's selection. Upon receiving information identifying that the user wishes to skip the video advertisement, the server can provide the selected video and a control configured to re-present the video advertisement. That is, the server can ensure that a user always has the ability to have the video advertisement available for re-presentation. If a user accidentally skips the video advertisement (such a result of a habit), he/she now has a method to view the video advertisement again. Furthermore, the server can provide a different version of the video advertisement if the server determines the different version is likely to be more effective with the user. Additionally, the server can associate a higher cost (e.g., charge more) when re-presenting a video advertisement as opposed to the cost for or associated with an initial presentation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods and computer program products for presenting and re-presenting content to a user are provided. In some implementations, a video content item is initially presented to a user. The video content item can be of the form of an advertisement that accompanies other content, such as a selected resource, e.g., another video item. Upon receipt of a skip command in association with the presentation of the video content item or completion of the presentation, e.g., based on detected interaction with a first control such as a skip button, a second control can be provided to facilitate re-presentation of the video content item. After receiving second information indicating that the user of the user device has interacted with the second control, the video content item can be provided for re-presentation to the user device.

Figure 1A:
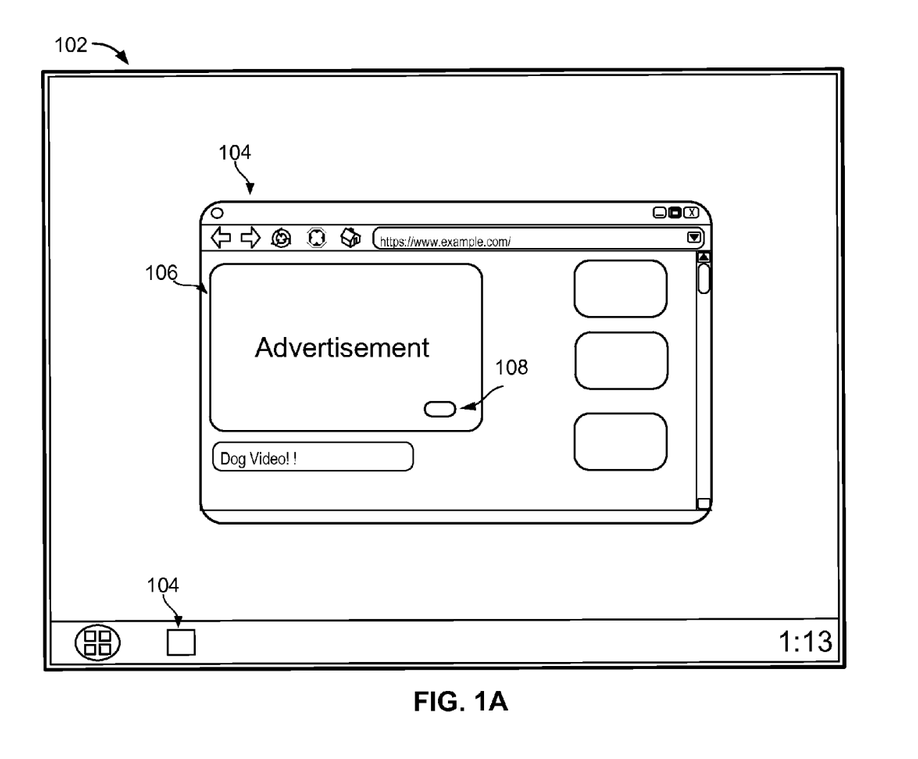
FIG. 1A is an example of a user interface of a user device that illustrates re-presentation of a content item.

FIG. 1A is an example of a user interface 102 of a user device that illustrates re-presentation of a first content item, e.g., a video advertisement 106. A user device executing software 104, e.g., an Internet browser, configured to display a resource, e.g., a webpage, can present a video advertisement 106 from a server for display on the user device, e.g., a computer or mobile device. In this example, a user has selected a video content item, and has received in response a video advertisement 106 for presentation prior to receiving the selected video content item. The video advertisement 106 includes a first control 108, e.g., a button, configured to receive a user interaction, e.g., a click, a swipe, user entered audio such as speech, or a touch. Upon receiving a user interaction in association with the first control 108, information can be provided to the server identifying that the user wants to skip the video advertisement 106 and receive the selected video content item for presentation on the user device.

Figure 1B:
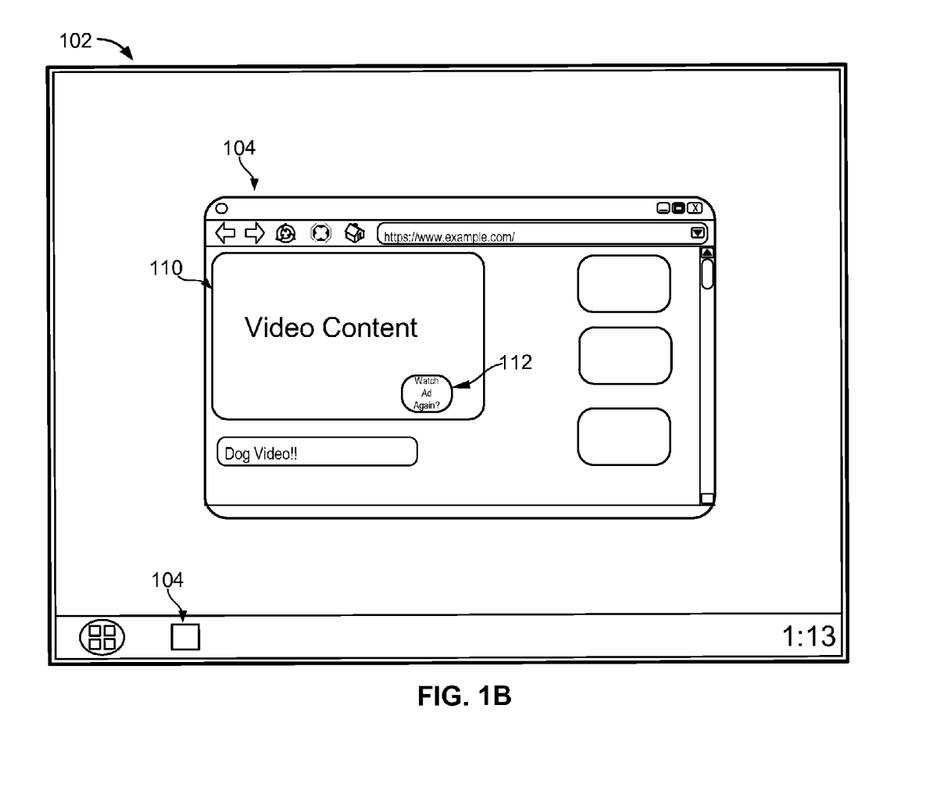
FIG. 1B is another example of a user interface of a user device that illustrates re-presentation of a content item.

FIG. 1B is an example of a user interface 102 of a user device that illustrates re-presentation of a first content item, e.g., video advertisement 106. The software 104, e.g., an Internet browser, is presenting the selected video content item 110. The selected video content item 110 includes a second control 112, e.g., a button, configured to receive a user interaction, e.g., a click, a swipe, user entered audio such as speech, or a touch. Upon receipt of the user interaction, information can be provided to the server identifying that the user wants to view the video advertisement 106. That is, the second control 112 can identify to the server that the user wants to receive the video advertisement 106 for re-presentation on the user device. In some implementations the second control can include text identifying that a user can interact with the second control to receive the video advertisement 106 for re-presentation. For instance the control can display "Watch Ad Again?" or "Display Video Advertisement," or equivalent phrases.

Figure 2:
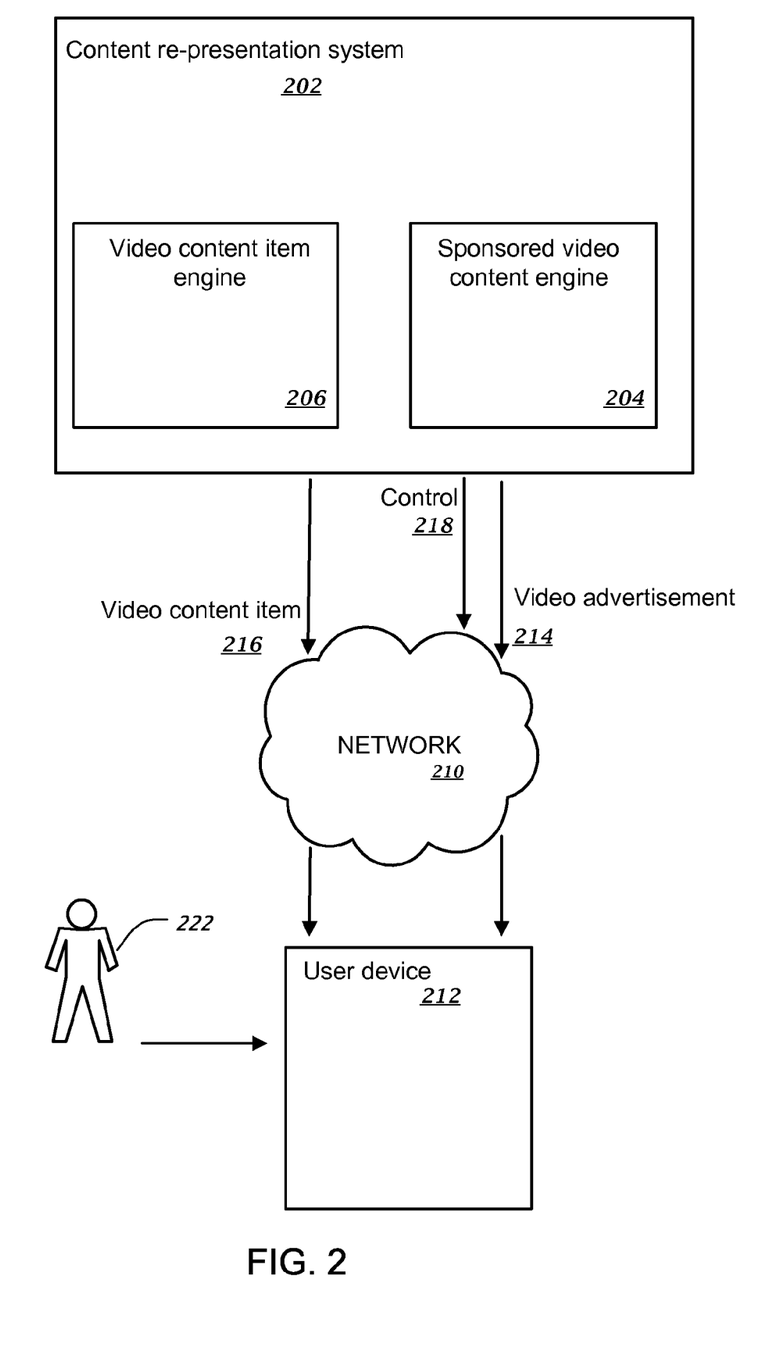
FIG. 2 is a diagram of a content re-presentation system.

FIG. 2 is a diagram of a content re-presentation system 202 used for re-presentation of certain content, e.g., video advertisements. The content re-presentation system 202 can include a video content item engine 206 and a sponsored video content engine 204 connected to a user device 212, e.g., a client device, a computer, tablet, hybrid computing device or mobile device, through a network 210, e.g., the Internet. The video content item engine 206 and the sponsored video content item engine 204 can be one or more computing resources, e.g., particular computer system hardware or software executing on one or more computer systems, e.g., virtual machines. In some implementations the video content item engine 206 and the sponsored video content item engine 204 can be a part of the same system, e.g., the content re-presentation system 202. In some implementations the video content item engine 206 and sponsored video content item engine 204 can be different computing resources and communicate through a network, e.g., network 210.

The user device 212 can access a resource, e.g., a webpage, configured to receive a request to view a selected video content item 216. The user device 212 can provide the selection of a video content item 216 to the video content engine 206 and receive the selected video content item 216 for presentation on the user device 212. The video content items can be videos uploaded by other users, e.g., cat videos, movie trailers, videos about nature, technology news, and so on.

Upon receipt of a request to view a selected video content item 216 by the content re-presentation system 202, the sponsored video content item engine 204 can provide a first content item, e.g., a video advertisement 214, for presentation on the user device 212. The video advertisement 214 can be stored on the on or in association with content re-presentation system 202, or can be obtained from a third party and provided for presentation on the user device 212.

The sponsored video content item engine 204 can provide a first control with the first content item, e.g., the video advertisement 214, configured to receive interactions from the user device 212 identifying that a user 222 wants to skip the first content item. In some implementations the first control is configured to accept interactions after a threshold viewing time, e.g., the user 222 has to view the video advertisement 214 for 3, 5, or 8 seconds before the first control will facilitate skipping the video advertisement. After receiving information identifying that the user 222 wants to skip the first content item, e.g., video advertisement 214, the sponsored video content item engine 204 or outside server resource provides the selected video content item 216 for presentation on the user device 212. In some implementations the content re-presentation system 202 can store a state of the first content item that identifies a playing time of the video content item, e.g., the amount of time the content item was played before being skipped.

A second control 218 can be provided with the selected video content item 216 that is configured to receive interactions from the user device 212 identifying that the user 222 wants to re-view the first content item, e.g., the video advertisement 214. In some implementations, upon receipt of an interaction the content re-presentation system 202 can store a state of the selected video content item 216 that identifies a playing time. After receiving information identifying that the user 222 has interacted with the second control 218, the sponsored video content item engine 204 can provide the first content item, e.g., the video advertisement 214, for re-presentation on the user device 212. Upon re-viewing/or re-presenting the first content item, e.g., the video advertisement 214, the content re-presentation system 202 can provide the selected video content item 216 for re-presentation on the user device 212. In some implementations the selected video content item 216 can be presented from the point the second control was interacted with, e.g., the playing time identified by the stored state of the video content item 216.

Figure 3:
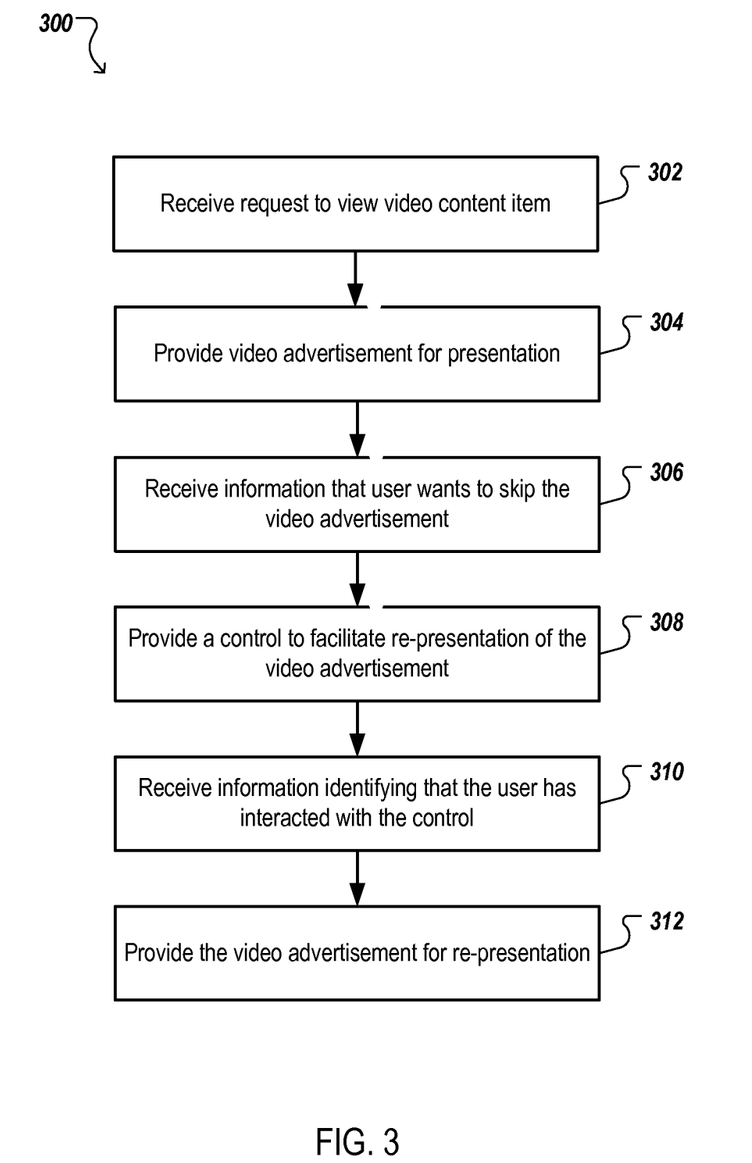
FIG. 3 illustrates an example process of providing a content item for re-presentation.

FIG. 3 illustrates an example process 300 for providing a video content item for re-presentation. For convenience, the process 300 will be described as being performed by a system of one or more computers located in one or more locations. For example, the content re-presentation system 202 of FIG. 2, appropriately programmed in accordance with this specification, can perform the process 300.

A request to view a video content item is received (step 302). A user of a user device can access a resource identifying one or more video content items for selection, e.g., a webpage, and provide a selection of a video content item to the system. The video content items can be videos stored on the system and uploaded by users of the system, or can be video content items obtained from a computer resource outside of the system through a network, e.g., the Internet. For instance, the video content items can include videos about cats, politics, musings, technology reviews, and so on. The resource can present one or more video content items to the user of the user device for selection, or the resource can receive a query from the user and a server can obtain video content items relevant to the query.

A selected or otherwise designated content item is provided for presentation on the user device (step 304). For example, the system can identify a selected video item and also a first content item, e.g., a video advertisement, that is related or otherwise assigned to the selected video item. The first content item can be a video advertisement that is presented, for example, to offset costs associated with the presentation of the selected video content item. A serving system can obtain the first content item, e.g., the video advertisement, from a database of video advertisements stored on the system or from an advertiser. The system stores information identifying the video advertisement with the user, e.g., the user's IP (internet protocol) address of the user device or a user log in name to the system. The system provides the first content item, e.g., video advertisement, for presentation by transmitting the first content item to the user device. Transmitting can include streaming the first content item, e.g., video advertisement, by providing subsets of the video advertisement continuously over the length of the video advertisement, or transmitting can include providing the entire first content item, e.g., video advertisement, for storage on the user device.

Information is received that the user wants to skip the first content item, e.g., the video advertisement, and receive the selected video content item for presentation on the user device (step 306). In some implementations a first control can be provided with the first content item and when interacted with, can result in the skipping of the first content item. For example, the control can include text identifying that the first content item, e.g., video advertisement, can be skipped, e.g., the control can include "Skip Advertisement" or equivalent text. The control can be interacted with by the user, e.g., the user can click on the control, swipe in a direction on the control, speak into the user device, and so on. If the user views the entirety of the first content item, the system can receive information identifying that the first content item has completed play and provide the initially selected video content item for presentation on the user device.

The state of the first content item can be stored, e.g., the playing time of the video advertisement can be stored. The state can be stored by the system and associated with the user.

A second control is provided to facilitate re-presentation of the first content item, e.g., video advertisement (step 308). For example, the content re-presentation system 202 or another serving system can obtain the selected video content item, e.g., from local storage or from a computing resource outside of the system, for presentation on the user device. The second control can be configured to provide information that the user wants to re-view the first content item, e.g., video advertisement. The second control can be presented concurrently with the presentation of the selected video content item, or provided as an overlay, e.g., on top of the first content item such as in a corner of the video content item away from the user's notice.

In some implementations the content re-presentation system 202 can first determine a playing time of the first content item from the stored state, and provide or activate the first control upon determining that the play time exceeds a threshold, e.g., 3, 5, or 8 seconds. In some implementations the content re-presentation system 202 can provide the first control upon determining that the play time is less than a threshold, e.g., 3, 5, or 8 seconds.

In some implementations a static image can be retrieved from the first content item and the method can further include providing the static image for presentation along with the video content item, e.g., as part of or in association with the second control. The static image can be located outside of the selected video content item, e.g., located next to the selected video content item or in a particular location associated with advertisements. The static image can be the first frame of a sponsored video content item, the final frame displayed to the user, or a frame identified previously as being representative of the sponsored video content item, e.g., by the system, an advertiser, or a third party.

Information identifying that the user has interacted with the second control is received (step 310). For example, the content re-presentation system 202 can receive information from the user device identifying that the user has interacted with the second control, and wants to re-view the first content item, e.g., the video advertisement. The interaction can include the user clicking on the second control, or swiping on the second control, to name a few examples. In some implementations where a static image is the second control, the information can identify that a user has interacted with the static image, e.g., the user clicked on the static image.

In some implementations, upon receipt of an interaction with the second control, the content re-presentation system 202 can store the state of the selected content item and pause the playing of the selected content item. The state can identify a play time of the selected video content item, and the content re-presentation system 202 can associate the state with the user/user device.

The first content item, e.g., the video advertisement, is provided for re-presentation on the user device (step 312). For example, in response to receiving an interaction with the second control, the content re-presentation system provides the video advertisement for re-presentation. In some implementations the system can access the information associated with the user, e.g., the particular video advertisement and play time of the video advertisement, obtain the video advertisement based on the information, and provide the video advertisement for re-presentation on the user device from the start of the video advertisement. In some implementations the system can access the information associated with the user, and provide the video advertisement from the playing time of the first content item, e.g., the video advertisement, for re-presentation on the user device.

Additionally, in some implementations, the content re-presentation system 202 can again provide a first control with the re-presented first content item, e.g. replayed video advertisement, to facilitate skipping the first content item a second time. Upon receiving an interaction with the first control, the content re-presentation system can provide the originally selected video content item for re-presentation on the user device. In some implementations the system can access the stored state of the video content item associated with the user, and provide the video content item from the play time identified by the state.

In some implementations the content re-presentation system 202 can provide a modified first content item in response to a request for re-presentation, e.g., a video advertisement with a shorter play time than the initial/original video advertisement provided to the user. For example, the content re-presentation system 202 can determine that the play time of the video advertisement was below a threshold, e.g., 3, 5, or 7 seconds, and provide a shorter version of the advertisement for re-presentation. In some implementations, the threshold can be a global threshold generic to all video advertisements. Alternatively, the threshold can be specific to each video advertisement, e.g., defined by the advertiser of the advertisement or determined through heuristics of user habits viewing the video advertisement, e.g., the content re-presentation system 202 can store watch times of the video advertisement across multiple users and store the average watch time as the threshold.

Additionally, the content re-presentation system 202 can access a database storing versions of the first content item, e.g., the video advertisement, that are mapped to particular user play times of the initially presented first content item, and obtain a specific version based on the mapping. In some implementations, the database can include an optimal version of a video advertisement that is based on the play time of the initially presented video advertisement, e.g., the version of the video advertisement most effective with users that watched the initial video advertisement for a specific play time. Entries in the database can be determined based on the probability that a user will watch the version of the video advertisement given that they watched the initial video advertisement for a specific play time. The content re-presentation system 202 can determine the respective probabilities from historical data of users, e.g., the system can correlate a particular play time of an initial video advertisement, with the percentage of users that watched the entirety of alternative versions of the video advertisement.

In some implementations the content re-presentation system 202 can provide a different first content item in response to the re-presentation request. For example, the system can provide a video advertisement from a different advertiser, or a different video advertisement from the same advertiser. In some implementations the system can provide a different video advertisement upon determining that the play time of the initial video advertisement was below a threshold, e.g., 1, 2, or 3 seconds.

The content re-presentation system 202 can associate a cost with the initial presentation of the first content item, e.g., a charge to the advertiser of the video advertisement for presenting the video advertisement to the user, and a second cost for re-presentation of the first content item. In some implementations the second cost can be higher than the first cost.

In some implementations the re-presentation system can provide a web page of the sponsor, e.g., advertiser, of the first content item to the user. That is, the system can provide the web page of the sponsor instead of re-presenting the first content item. In some implementations the system can provide the web page in addition to re-presenting the first content item, or provide the web page upon the user completing viewing the first content item.

Upon the completion of a presentation of the first content item, the system can provide the selected video content item for re-presentation on the user device. In some implementations the system can access the stored state of the selected video content item associated with the prior presentation to the user, and provide the video content item from the play time identified by the state.

Figure 4:
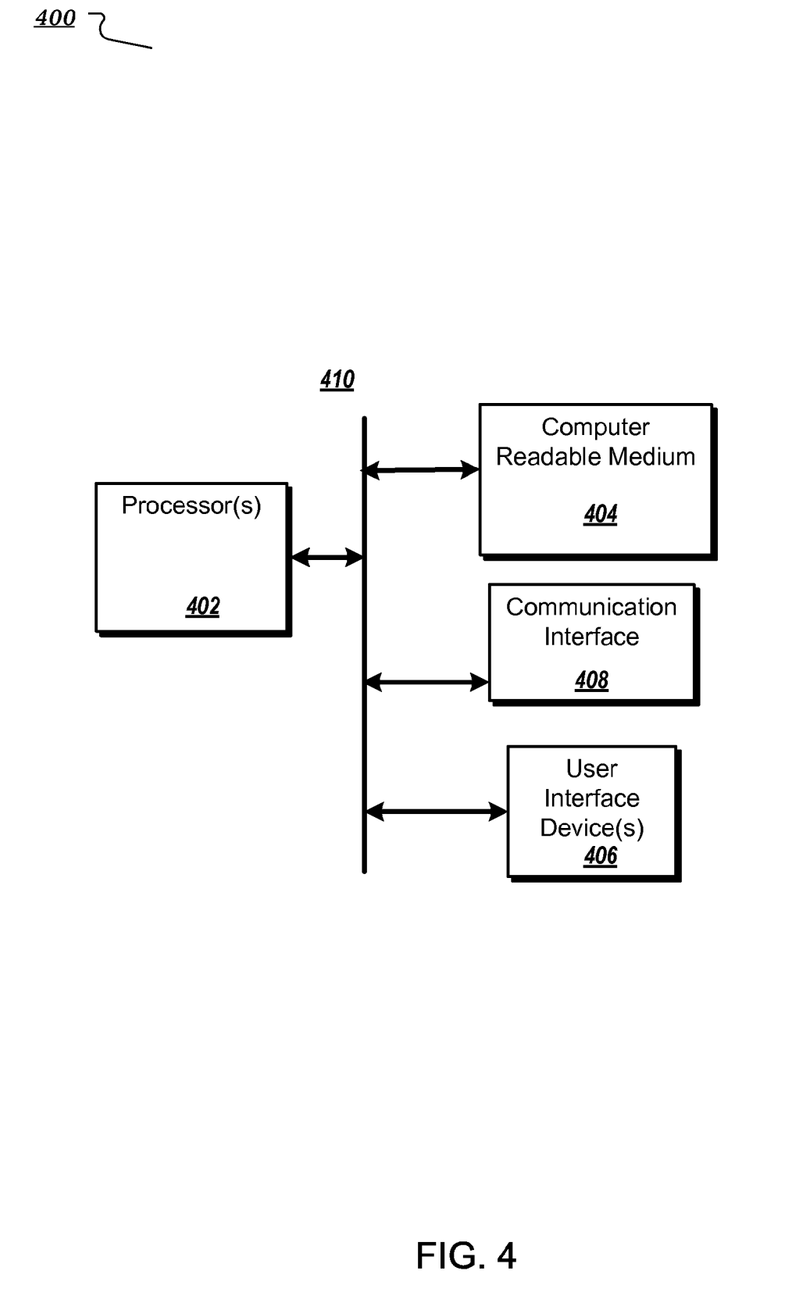
FIG. 4 is block diagram of an example computer system.

FIG. 4 is a block diagram of an example data processing apparatus 400 that can implement the content re-presentation system. While only one data processing apparatus is shown in FIG. 4, the content re-presentation system may consist of multiple data processing apparatus.

The data processing apparatus 400 can have hardware or firmware devices connected by a bus 410, including one or more processors 402, computer readable medium 404 to store instructions and data, and one or more user interface devices 406. Examples of user interface devices 406 include a display, a camera, a speaker, a microphone, a tactile feedback device, a keyboard, and a mouse. The data processing apparatus 400 includes a communication interface 408 to communicate with other data processing apparatus over the Internet, a LAN, or a WAN.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device, e.g., user device, in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
  in response to receiving a request to view a video content item, providing a video advertisement for presentation on a user device along with the video content item;

receiving first information indicating that a user of the user device wants to skip the video advertisement or that the video advertisement has completed play;

in accordance with a first determination that the first information indicates that the video advertisement has completed play, providing a control to facilitate re-presentation of the video advertisement;

in accordance with a second determination that the first information indicates that the user wants to skip the video advertisement, determining a state of the video advertisement;

obtaining information identifying an average watch time of the video advertisement;

determining, from the state of the video advertisement, that a play time of the video advertisement is less than the average watch time; and providing a second video advertisement with a shorter play time for presentation to the user device;

receiving second information indicating that the user of the user device has interacted with the control; and providing the video advertisement for re-presentation to the user device.

2. The method of claim 1, wherein providing the video advertisement further comprises:

obtaining a static image from the video advertisement; and providing the static image for presentation along with the video content item.

3. The method of claim 2, further comprising:

receiving information indicating that the user has interacted with the static image; and providing the video advertisement for re-presentation.

4. The method of claim 1, wherein providing a control comprises:

determining, from the state of the video advertisement, that a play time of the video advertisement is greater than a threshold; and in response to the determination, providing the control to facilitate re-presentation of the video advertisement.

5. The method of claim 1, wherein providing a control comprises:

determining, from the state of the video advertisement, that a play time of the video advertisement is less than a threshold; and in response to the determination, providing the control to facilitate re-presentation of the video advertisement.

6. The method of claim 1, wherein providing the video advertisement for re-presentation comprises:

determining a play time of the video advertisement from the state of the video advertisement; and providing the video advertisement for presentation to the user device, wherein the video advertisement is provided from the play time.

7. The method of claim 1, wherein providing the video advertisement for re-presentation comprises:

determining, from the state of the video advertisement, that a play time of the video advertisement is less than a threshold; and providing a video advertisement with a shorter play time for presentation to the user device.

8. The method of claim 1, further comprising:

determining a state of the video content item at a time of the interaction;

determining, from the state of the video content item, a play time of the video content item;

providing the video advertisement for re-presentation to the user device; and providing the video content item from the play time for re-presentation to the user device.

9. The method of claim 1, wherein providing the video advertisement for re-presentation comprises:

providing a second control to facilitate skipping the video advertisement.

10. The method of claim 1, wherein providing the video advertisement for re-presentation comprises:

providing a different video advertisement for presentation to the user device.

11. The method of claim 1 further comprising:

redirecting the user device to a web page of a sponsor of the video advertisement.

12. The method of claim 1 further comprising:

associating the video advertisement with a first cost;

providing the video advertisement for re-presentation to the user device; and in response to the providing, associating the video advertisement with a second greater cost.

13. A system comprising:

one or more computers and one or more storage devices storing instructions that are operable, when executed by the one or more computers, to cause the one or more computers to perform operations comprising:

in response to receiving a request to view a video content item, providing a video advertisement for presentation on a user device along with the video content item;

receiving first information indicating that a user of the user device wants to skip the video advertisement or that the video advertisement has completed play;

in accordance with a first determination that the first information indicates that the video advertisement has completed play, providing a control to facilitate re-presentation of the video advertisement;

in accordance with a second determination that the first information indicates that the user wants to skip the video advertisement, determining a state of the video advertisement;

obtaining information identifying an average watch time of the video advertisement;

determining, from the state of the video advertisement, that a play time of the video advertisement is less than the average watch time; and providing a second video advertisement with a shorter play time for presentation to the user device;

receiving second information indicating that the user of the user device has interacted with the control; and providing the video advertisement for re-presentation to the user device.

14. The system of claim 13, wherein providing a control comprises:

determining a state of the video advertisement;

determining, from the state of the video advertisement, that a play time of the video advertisement is greater than a threshold; and in response to the determination, providing the control to facilitate re-presentation of the video advertisement.

15. The system of claim 13, wherein providing a control comprises:

determining a state of the video advertisement;

determining, from the state of the video advertisement, that a play time of the video advertisement is less than a threshold; and in response to the determination, providing the control to facilitate re-presentation of the video advertisement.

16. A computer program product, encoded on one or more non-transitory computer storage media, comprising instructions that when executed by one or more computers cause the one or more computers to perform operations comprising:
- in response to receiving a request to view a video content item, providing a video advertisement for presentation on a user device along with the video content item;
- receiving first information indicating that a user of the user device wants to skip the video advertisement or that the video advertisement has completed play;
- in accordance with a first determination that the first information indicates that the video advertisement has completed play,
  - providing a control to facilitate re-presentation of the video advertisement;
- in accordance with a second determination that the first information indicates that the user wants to skip the video advertisement,
  - determining a state of the video advertisement;
  - obtaining information identifying an average watch time of the video advertisement;
  - determining, from the state of the video advertisement, that a play time of the video advertisement is less than the average watch time; and
  - providing a second video advertisement with a shorter play time for presentation to the user device;
- receiving second information indicating that the user of the user device has interacted with the control; and
- providing the video advertisement for re-presentation to the user device.

17. The computer program product of claim 16, wherein providing a control comprises:
- determining a state of the video advertisement;
- determining, from the state of the video advertisement, that a play time of the video advertisement is greater than a threshold; and
- in response to the determination, providing the control to facilitate re-presentation of the video advertisement.

18. The computer program product of claim 16, wherein providing a control comprises:
- determining a state of the video advertisement;
- determining, from the state of the video advertisement, that a play time of the video advertisement is less than a threshold; and
- in response to the determination, providing the control to facilitate re-presentation of the video advertisement.

* * * * *